(12) United States Patent
Izawa et al.

(10) Patent No.: US 11,137,935 B2
(45) Date of Patent: Oct. 5, 2021

(54) STORAGE SYSTEM WITH PLURALITY OF STORAGE CONTROLLERS COMMUNICATIVELY COUPLED FOR DETERMINATION OF STORAGE CONTROLLER INDENTIFIERS

(71) Applicant: HITACHI, LTD., Tokyo (JP)

(72) Inventors: Shinsuke Izawa, Tokyo (JP); Sadahiro Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/812,586

(22) Filed: Mar. 9, 2020

(65) Prior Publication Data
US 2020/0210099 A1 Jul. 2, 2020

Related U.S. Application Data

(63) Continuation of application No. 16/561,856, filed on Sep. 5, 2019, now Pat. No. 10,606,508.

(30) Foreign Application Priority Data

Nov. 7, 2018 (JP) .............................. JP2018-209342

(51) Int. Cl.
*G06F 3/06* (2006.01)
*G06F 13/40* (2006.01)
*G06F 13/12* (2006.01)

(52) U.S. Cl.
CPC .......... *G06F 3/0655* (2013.01); *G06F 3/0623* (2013.01); *G06F 3/0683* (2013.01); *G06F 13/126* (2013.01); *G06F 13/4022* (2013.01)

(58) Field of Classification Search
CPC .......................... G06F 3/0655; G06F 13/4022
See application file for complete search history.

(56) References Cited

U.S. PATENT DOCUMENTS

2010/0191948 A1   7/2010 Komoriya et al.
2012/0079139 A1*  3/2012 Sonokawa .......... H04L 43/0811
                                              710/16

(Continued)

FOREIGN PATENT DOCUMENTS

JP    2010-170351 A    8/2010
JP    2016-212474 A   12/2016

OTHER PUBLICATIONS

Japanese Office Action dated Dec. 22, 2020 for Japanese Patent Application No. 2018-209342.

*Primary Examiner* — David E Martinez
(74) *Attorney, Agent, or Firm* — Volpe Koenig (57) ABSTRACT

Provided is a storage system in which a plurality of storage controllers communicate with each other and an identifier of each storage controller is determined. The storage system includes a plurality of controllers that receive and process an input and output request specifying any of a plurality of volumes from an external device, and a plurality of switches each having a plurality of ports. The plurality of controllers are connected in parallel to the plurality of switches and communicate with each other via the plurality of switches. Each of the plurality of controllers acquires a plurality of port identifiers identifying a plurality of connected ports from the connected switches, and determines a controller identifier in the storage system based on the acquired plurality of port identifiers.

14 Claims, 9 Drawing Sheets

(56) References Cited

U.S. PATENT DOCUMENTS

| | | |
|---|---|---|
| 2015/0378814 A1 | 12/2015 | Webb et al. |
| 2016/0320993 A1* | 11/2016 | Oota .................. G06F 11/3034 |
| 2018/0165156 A1 | 6/2018 | Sasaki et al. |

* cited by examiner

STORAGE SYSTEM WITH PLURALITY OF STORAGE CONTROLLERS COMMUNICATIVELY COUPLED FOR DETERMINATION OF STORAGE CONTROLLER INDENTIFIERS

CLAIM OF PRIORITY

This application is a continuation of U.S. patent application Ser. No. 16/561,856, which claims priority from Japanese patent application JP2018-209342 filed on Nov. 7, 2018, the content of which is hereby incorporated by reference into this application.

BACKGROUND OF THE INVENTION

1. Field of the Invention

The present invention relates to a storage system.

2. Description of the Related Art

In order to reduce an introduction cost, a company that provides a cloud service constructs a storage system using resources that are required at the time of initial operation of a service. A company often uses a scale-out storage system, which improves the processing performance of the overall system by increasing the number of storage controllers in the storage system, when a service is operated and a usage amount of resources increases.

A scale-out storage system integrates and controls a plurality of storage controllers as a single storage system. The storage controllers in the storage system mutually transmit and receive messages and read and write control information. In order to perform communication among the storage controllers, it is necessary to assign an address to each storage controller. In order to assign an address to each storage controller, each storage controller needs to have a unique identification number. As a method of assigning an address, for example, it is disclosed in JP-A-2010-170351 (Patent Literature 1) that identification numbers of controllers are managed and assigned outside the controllers.

For example, in a scale-out storage system, it is necessary to uniquely determine an address of each storage controller so as to start communication among storage controllers to which no address is assigned at the time of an initial startup. In order to assign an address of each storage controller, each storage controller needs to have a unique identifier in a system.

Patent Literature 1 can uniquely determine the address of each storage controller. However, according to Patent Literature 1, a device different from the storage controller is required to manage and assign an identifier of each storage controller.

SUMMARY OF THE INVENTION

A storage system according to an aspect of the invention includes a plurality of controllers that receive and process an input and output request specifying any of a plurality of volumes from an external device, and a plurality of switches each having a plurality of ports. The plurality of controllers are connected in parallel to the plurality of switches and communicate with each other via the plurality of switches. Each of the plurality of controllers acquires a plurality of port identifiers identifying a plurality of connected ports from the connected switches, and determines a controller identifier in the storage system based on the acquired plurality of port identifiers.

According to an aspect of the invention, in a system in which a plurality of storage controllers communicate with each other, an identifier of each storage controller in the system can be determined.

Problems, configurations, and effects other than those described above will be clarified by descriptions of the following embodiments.

DESCRIPTION OF EMBODIMENTS

Hereinafter, an embodiment of the invention will be described with reference to the drawings. The present embodiment describes an example in which identification numbers of a plurality of storage controllers can be automatically determined in a scale-out storage system. It should be noted that the embodiment described below does not limit the invention according to the claims, and all combinations of features described in the embodiment are not necessarily essential to the solution to the problem.

Figure 1:
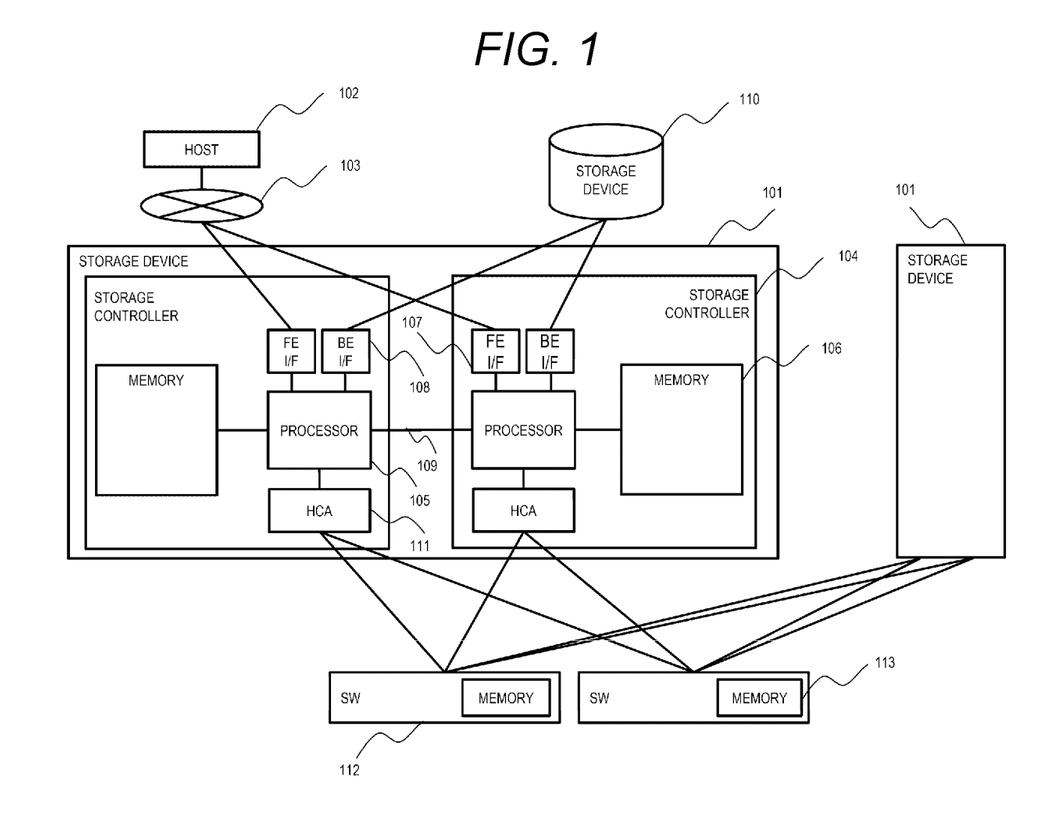
FIG. 1 shows a configuration example of a computer system.

FIG. 1 shows a configuration example of a computer system. The computer system includes a plurality of storage devices 101, a host 102, and an external network 103 that connects the host 102 and the storage devices 101. The number of storage devices 101 is an arbitrary number of two or more, and the number of the host 102 is arbitrary.

The storage device 101 includes one or more storage controllers (hereinafter referred to as controllers) 104. Each controller 104 includes one or more microprocessors (hereinafter referred to as processors) 105, one or more memories 106, one or more host interfaces (I/Fs) 107, one or more drive I/Fs 108, and one or more Host Channel Adapters (HCA) 111.

The controllers 104 are connected by an inter-controller path 109. The memories 106 can access each other by the processor 105 or a Direct Memory Access (DMA) circuit (not shown).

Hereinafter, an example of the storage device 101 having two controllers will be described for the sake of simplicity, but the number of mounted controllers is arbitrary. When a processor is a multi-core processor, a part of cores in the processor is considered as a group and may be logically managed as a plurality of processors.

The host I/F 107 is connected to the host 102 through the external network 103 such as a Storage Area Network (SAN). The external network 103 can use any protocol capable of data communication.

The controller 104 of the storage device 101 is connected to one or more storage devices 110 via the drive I/F 108. The storage device 110 may be, for example, a hard disk drive (HDD), a solid state drive (SSD), or a tape type storage device.

The storage device 110 can constitute a logical volume based on a memory area thereof and provide the controller 104 with the logical volume. A plurality of storage devices 110 may constitute a Redundant Array of Independent Disks (RAID) group for redundancy and may provide a logical volume from the constituted RAID group.

The controller 104 can provide a logical volume to the host 102 as a Logical Unit (LU) and can receive a writing request and a reading request for an address specified by the host 102. In each logical volume, one processor 105 in charge of I/O processing is set.

The storage devices 101 are connected to one or more other storage devices 101 via the HCA 111 and one or more switches (SWs) 112. The computer system includes a plurality of SWs 112 which are connected in parallel to the storage devices 101, respectively. The SWs 112 are communicably connected to each other. Each of the SWs 112 includes a memory 113. The plurality of storage devices 101 and the plurality of SWs 112 are contained in a storage system. In the following description, the storage system is a scale-out storage system.

Figure 2:
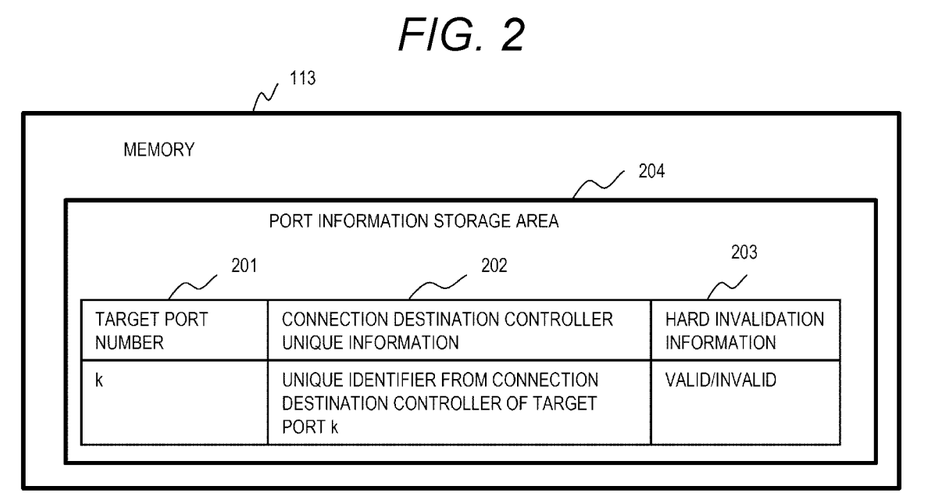
FIG. 2 shows a configuration of a memory.

FIG. 2 shows a logical configuration of the memory 113 of the SW 112. A port information storage area 204 in the memory 113 includes areas of a target port number 201, connection destination controller unique information 202, and hard invalidation information 203. The target port number 201 is an area in which information on a port number of the SW 112 is stored.

The target port number 201 stores numbers of all ports (physical ports) of the SW 112. The connection destination controller unique information 202 is an area used for storing a controller unique identifier such as a controller unique ID or a controller unique number received from the controller connected to the port of the target port number 201. The controller identifier is, for example, a revision of a Printed Circuit Board (PCB). The hard invalidation information 203 stores information indicating whether the port of the target port number 201 is valid or invalid.

Figure 3:
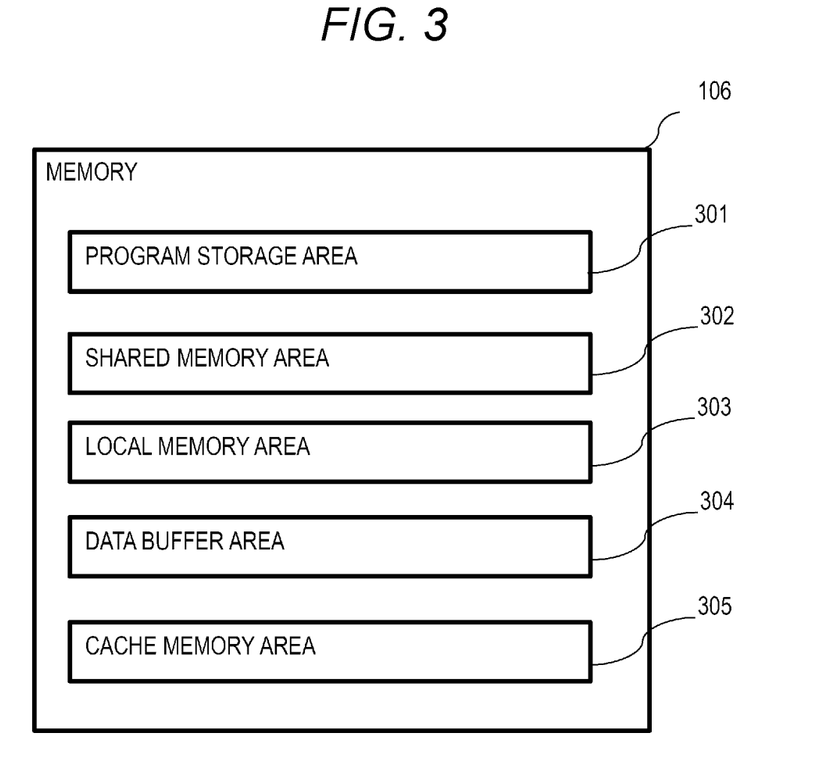
FIG. 3 shows a logical configuration of a memory.

FIG. 3 shows a logical configuration of the memory 106 of the controller 104. The memory 106 includes a program storage area 301, a shared memory area 302, a local memory area 303, a data buffer area 304, and a cache memory area 305.

The program storage area 301 is an area used for storing a program for the processor 105 of the same controller 104 to execute processing. The shared memory area 302 stores various types of control information in an area accessed from all the processors 105 in the storage system. The local memory area 303 is an area accessed only by the specific processor 105. The memory 106 includes the same number of local memory areas 303 as the number of processors 105 in the storage system. In FIG. 3, only one local memory area 303 is illustrated as an example.

The data buffer area 304 and the cache memory area 305 are areas used for temporarily storing data when the data is transferred by the host I/F 107, the drive I/F 108, the inter-controller path 109, or the like. The cache memory area 305 is divided into cache segments.

Figure 4:
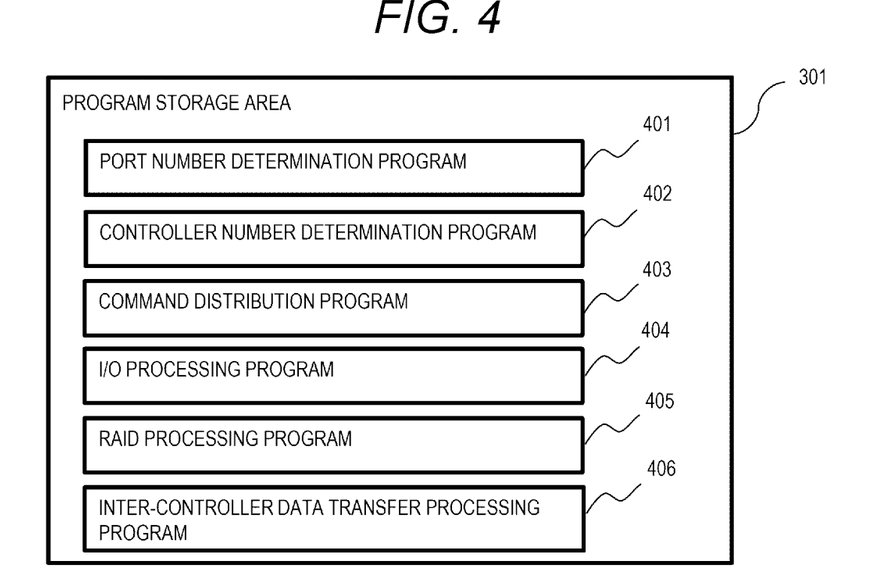
FIG. 4 shows a configuration of a program storage area.

FIG. 4 shows a logical configuration of the program storage area 301. The program storage area 301 stores a program for the processor 105 of the same controller 104 as the memory 106 to execute processing. For example, the program storage area 301 stores a port number determination program 401, a controller number determination program 402, a command distribution program 403, an I/O processing program 404, a RAID processing program 405, and an inter-controller data transfer processing program 406.

The port number determination program 401 and the controller number determination program 402 are a part of a program necessary for initial startup processing of the storage device 101.

The port number determination program 401 acquires a port number stored in the target port number 201 and a controller unique identifier stored in the connection destination controller unique information 202 from each of the connected SWs 112 via the HCA 111.

The port number determination program 401 determines whether a corresponding controller unique identifier is uniquely determined for each port number. When a plurality of controller unique identifiers are associated with one port number or when a plurality of port numbers are associated with one controller unique identifier, a corresponding controller unique identifier is not uniquely determined for each port number. When the corresponding controller unique identifier is not uniquely determined for each port number or when the controller unique identifier is not assigned to the port number, the port number determination program 401 invalidates the target hard invalidation information 203 of the port number thereof.

The controller number determination program 402 determines an identification number (hereinafter referred to as a controller number) of the controller 104 in the storage system based on a port number in the target port number 201 that is corresponding to the controller 104 determined by the port number determination program 401. The identification number is an example of an intra-system identifier.

The command distribution program 403, the I/O processing program 404, the RAID processing program 405, and the inter-controller data transfer processing program 406 are part of a program necessary for the I/O processing. A reading and writing request sent from the host 102 is distributed to the processor 105, which is in charge of the I/O processing, of the logical volume to be read and written by the command distribution program 403.

Next, the processor 105 in charge of the I/O processing executes reading and writing processing of a target area by the I/O processing program 404. At this time, the RAID processing program 405 performs staging and destaging on the storage device 110 as necessary. In addition, the inter-controller data transfer processing program 406 performs data transfer between controllers.

Figure 5:
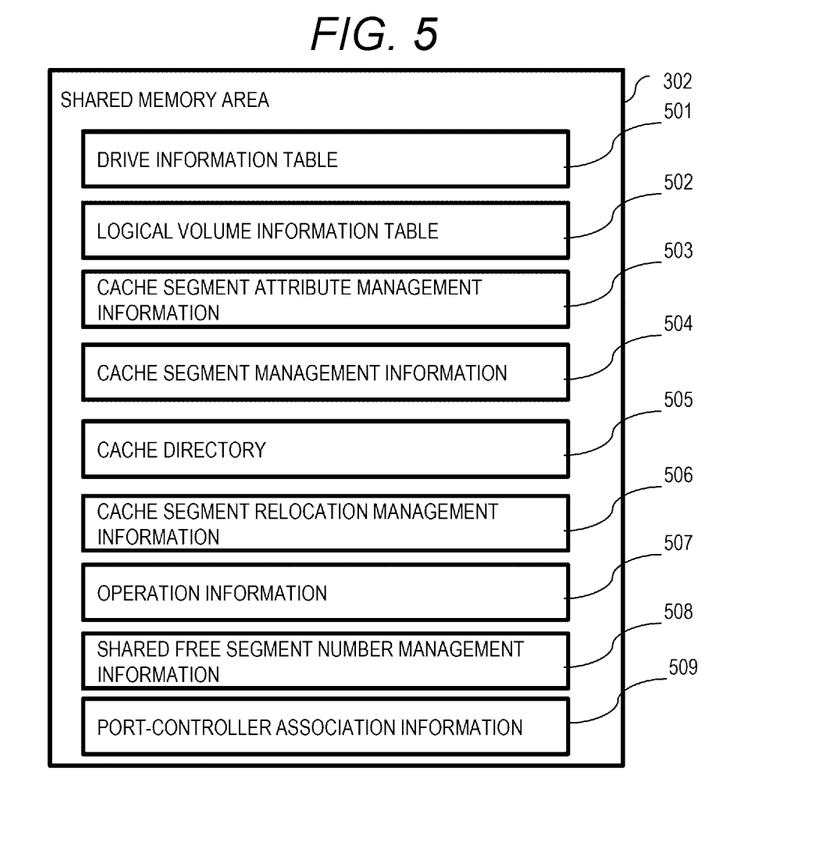
FIG. 5 shows a configuration of a shared memory area.

FIG. 5 shows a configuration of the shared memory area 302. The shared memory area 302 stores, in an area accessed by all processors, various types of control information including a drive information table 501, a logical volume information table 502, cache segment attribute management information 503, cache segment management information 504, a cache directory 505, cache segment relocation management information 506, operation information 507, shared free segment number management information 508, and port-controller association information 509.

A cache segment is managed by the cache segment attribute management information 503, the cache segment management information 504, and the cache directory 505. The port-controller association information 509 associates a port number with a unique identifier assigned to the controller 104 in the storage system. The port-controller association information 509 is referenced by the inter-controller data transfer processing program 406. Various types of control information in the shared memory area 302 may be copied between the memories 106 contained in each of the plurality of controllers 104 or be stored in the storage device 110 or another non-volatile memory.

Figure 6:
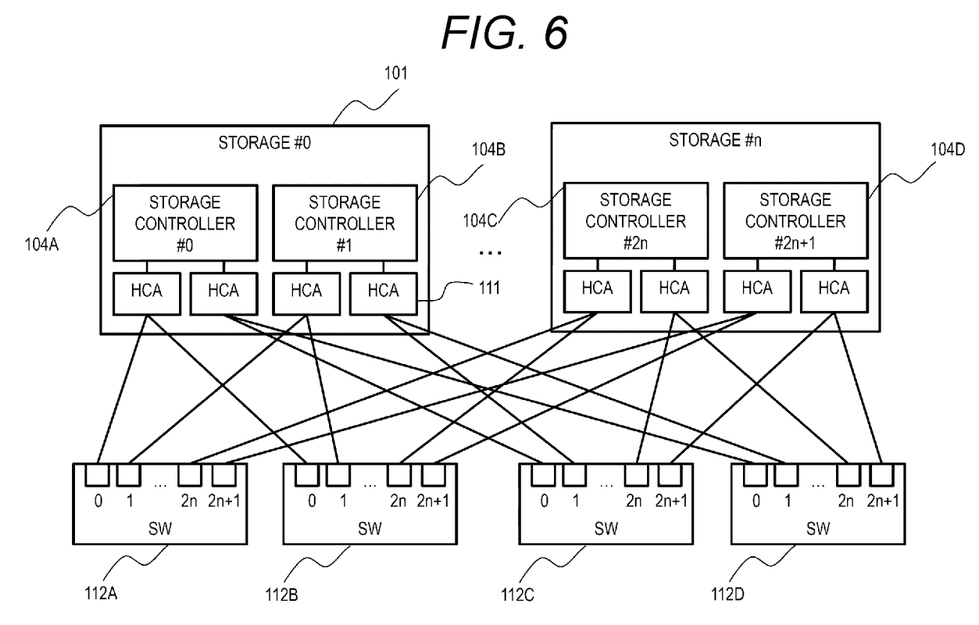
FIG. 6 shows a path connection configuration of a storage device and an SW.

FIG. 6 shows a path connection configuration of the storage devices 101 and the SWs 112. Although FIG. 6 shows a configuration example in which the number of storage devices 101 is n, the number of SWs is four (112A, 112B, 112C, and 112D), and the number of ports of each SW is 2n+2 (0 to 2n+1), the number of storage devices, the number of SWs, and the number of ports of each SW are not limited thereto.

When connecting each controller 104A, 104B, 104C and 104D and a plurality of SWs, the port number of each SW to be connected is fixed for each controller. For example, the controller 104A connects a path to a port 0 of an SW 112A, a port 0 of an SW 112B, a port 0 of an SW 112C, and a port 0 of an SW 112D. Further, the controller 104C connects a path to a port 2n of the SW 112A, a port 2n of the SW 112B, a port 2n of the SW 112C, and a port 2n of the SW 112D.

Based on the above path connection configuration, the present embodiment determines the controller number based on the port number connected to each controller 104. Any function that can determine the controller number to match from the port number can be used. For example, the controller number of the controller 104A connected to the port 0 of the SW 112A, the port 0 of the SW 112B, the port 0 of the SW 112C, and the port 0 of the SW 112D is set as 0. In addition, the controller number of the controller 104C connected to the port 2n of the SW 112A, the port 2n of the SW 112B, the port 2n of the SW 112C, and the port 2n of the SW 112D is set as 2n.

Figure 7:
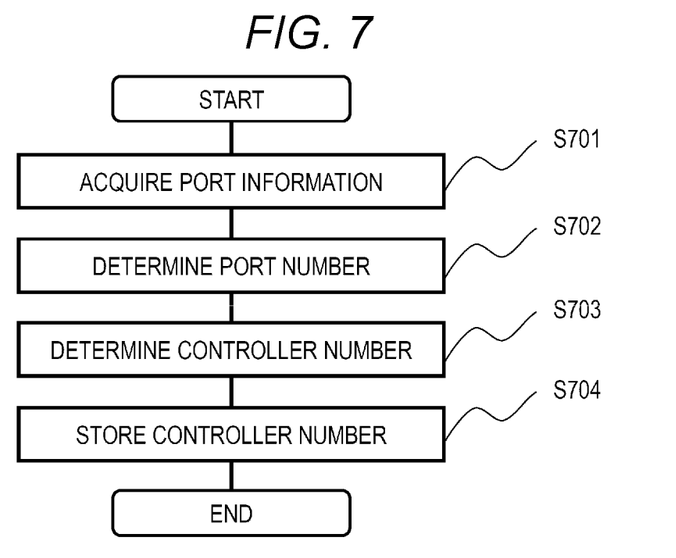
FIG. 7 is an example of a flowchart illustrating controller number determination processing.

FIG. 7 is an example of a flowchart illustrating controller number determination processing. In an initial startup of the storage system and the increasing and decreasing after the startup, the respective controllers 104 execute the processing according to the flowchart. An operation based on the flowchart is as follows.

In step 701, the processor 105 of the controller 104 acquires information stored in the port information storage area 204 of all the connected SWs 112 via the HCA 111 by the port number determination program 401.

In step 702, the port number determination program 401 determines whether the information from all the SWs 112 matches for a pair of a port number in which the hard invalidation information is valid and a controller unique identifier. When one port number constitutes pairs with a plurality of controller unique identifiers, or when a plurality of port numbers constitute pairs with a common controller unique identifier, the port number is contained in a mismatched pair.

When all pairs match, the flow proceeds to step 703. When any pair does not match, the port number determination program 401 determines whether to set the port of the port number contained in the mismatched pair to be invalid based on rules described in, for example, FIGS. 10 to 12. When it is determined to be invalid, the port number determination program 401 sets the information of the hard invalidation information 203 of the target port of the SW 112 to be invalid. When it is not determined to be invalid, the flow proceeds to step 703.

In step 703, the controller number determination program 402 determines the controller number based on the port number determined to match in step 702. In step 704, the controller number determination program 402 stores the controller number and the port number determined in step 703 in the port controller association information 509. The controller number and the port number may be stored in another storage area, for example, another storage area of the memory 106 in the controller 104 or a nonvolatile memory mounted in the storage device 101.

Figure 8:
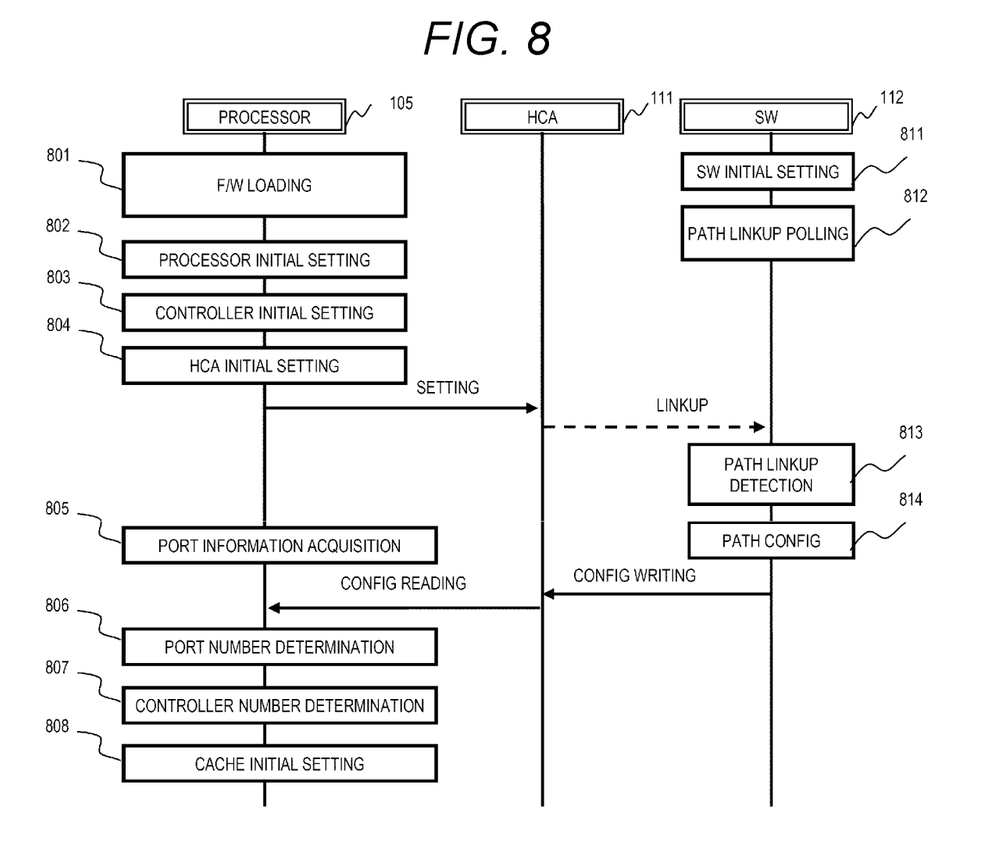
FIG. 8 is a sequence diagram illustrating the controller number determination processing.

FIG. 8 is a sequence diagram illustrating the controller number determination processing at an initial startup of the storage system. After the storage device 101 is powered on, the processor 105 performs loading of firmware (F/W) and a controller unique identifier thereof from a nonvolatile memory (not shown) 801. Thereafter, the processor 105 performs a processor initial setting 802 and a controller initial setting 803, and notifies an HCA in an HCA initial setting 804 of a message for the initial startup. After the initial startup, the HCA 111 performs a linkup with the SW 112 and becomes communicable.

On the other hand, after the SW 112 is powered on, the SW 112 performs an SW initial setting 811, and performs polling 812 until the path between the SW 112 and each of the storage device 101 is linked up. The SW 112 performs a path connection confirmation with the HCA 111 in path linkup detection 813. The SW 112 acquires the storage controller unique identifier stored in the connection destination controller unique information 202 via the HCA 111 at the time of the path linkup detection 813. After that, the SW 112 performs a path configuration setting 814, and stores information in the target port number 201, the connection destination controller unique information 202, and the hard invalidation information 203, which are shown in FIG. 2. When a linkup is detected, information of the hard invalidation information 203 of the port indicates validity.

Next, the SW 112 writes the information stored in the target port number 201, the connection destination controller unique information 202, and the hard invalidation information 203 to each connection destination HCA 111. In port information acquisition 805, the processor 105 reads information stored in the target port number 201, the connection destination controller unique information 202, and the hard invalidation information 203 from the HCA 111.

Thereafter, the processor 105 performs port number determination 806, controller number determination 807 and a cache initial setting 808. Here, the port information acquisition 805, the port number determination 806, and the controller number determination 807 follow the processing of steps 701, 702, and 703 in FIG. 7, separately.

As described above, by fixing the path connection configuration of the storage devices 101 and the SWs 112, an erroneous connection of the path may occur. Therefore, the port of the HCA 111 and the port of the SW 112 may be provided with a lamp so that the storage devices 101 and the SWs 112 may, for example, blink or turn on the lamp in red at the time of an erroneous connection. Accordingly, a user can be notified of the erroneous connection. Alternatively, the storage devices 101 and the SWs 112 may turn on the lamp in an order of paths to be connected so as to guide a path connection operation of the user.

Figure 9:
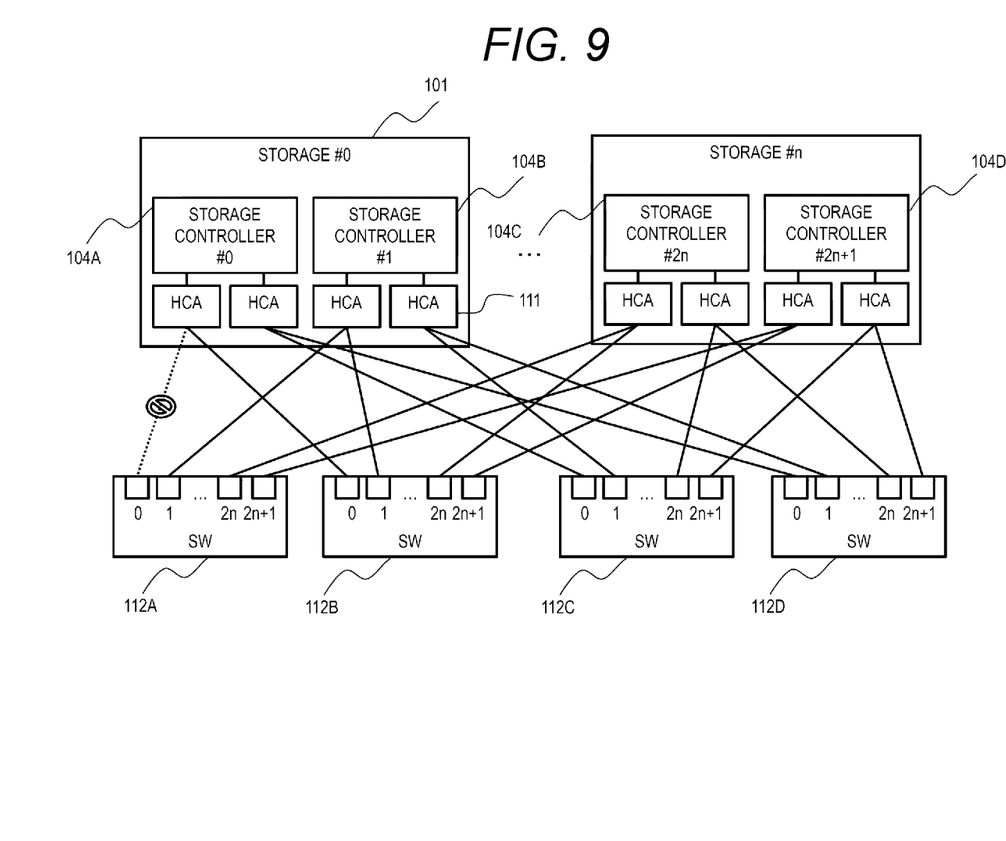
FIG. 9 shows an example of a one-path connection failure or an erroneous connection.

A method of determining a controller number when a path erroneous connection or a connection failure occurs will be described below with reference to FIGS. 9 to 12. FIG. 9 shows an example of a one-path connection failure or an erroneous connection. Based on the path connection configuration described in FIG. 6, a controller number determination method will be described by way of an example where there is no path connection between the controller 104A and the SW 112A due to the influence of the connection failure or the erroneous connection.

When acquiring port information from each of the SWs 112A, 112B, 112C, and 112D, the controller 104A cannot acquire the port information from the SW 112A since there is no path connection with the SW 112A. On the other hand, since the path of the controller 104A is connected to each port 0 of the SW 112B, SW 112C, and SW 112D, the controller 104A can acquire the port information from the SW 112B, SW 112C, and SW 112D. In this case, the controller 104A determines controller numbers of an own device and another controller based on the port information acquired from the SW 112B, SW 112C, and SW 112D.

In this way, even when a certain path is not connected due to a connection failure or an erroneous connection, when another path is normally connected, the controller can acquire the path information from another SW and determine the controller number of all the controllers. FIG. 9 shows an example in which one path is disconnected. Alternatively, when all the controllers can be connected via any of the SWs, the controller number can be determined even when a plurality of paths are disconnected.

Figure 10:
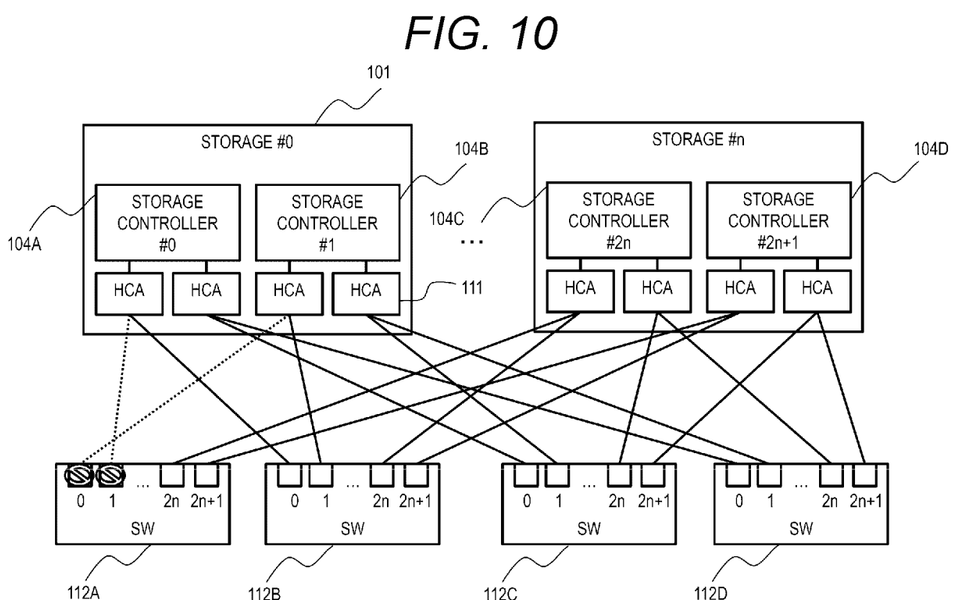
FIG. 10 shows an example of a two-path erroneous connection.

FIG. 10 shows an example of a two-path erroneous connection. Based on the path connection configuration described in FIG. 6, a controller number determination method will be described by way of an example where the controller 104A and the controller 104B are connected to incorrect ports.

Any controller 104 acquires port information from each of the SWs 112A, 112B, 112C, and 112D. For example, the port information from the SW 112A indicates that the controller 104A is connected to a port 1, and the port information from the SW 112B, SW 112C, and SW 112D indicates that the controller 104A is connected to the port 0. Further, the port information from the SW 112A indicates that the controller 104B is connected to the port 0, and the port information from the SW 112B, SW 112C, and SW 112D indicates that the controller 104B is connected to the port 1.

When determining the port number, the port number determination program 401 compares the port information from each SW and adopts the port number to which the largest number of ports are connected. Accordingly, more ports can be used. At this time, since the port of the SW 112 to which the small number of ports are connected is not used, the port number determination program 401 sets the hard invalidation information 203 of the memory 113 of the SW 112 to be invalid.

In a case of FIG. 10, the port number determination program 401 determines that the controller 104A is connected to the port 0 of each SW 112, and that the controller 104B is connected to the port 1 of each SW 112. In addition, the hard invalidation information 203 of the port 0 and the port 1 of the SW 112A is set to be invalid.

Figure 11:
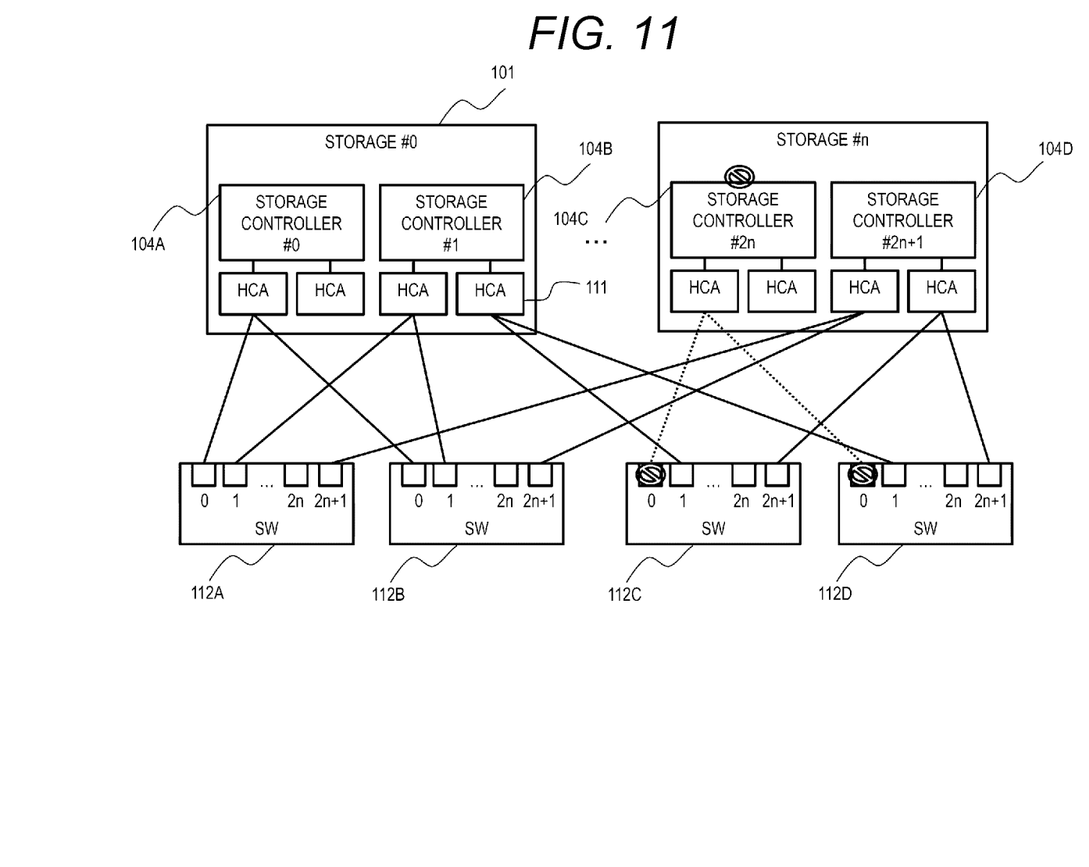
FIG. 11 shows an example of a controller blocking due to an erroneous connection.

FIG. 11 shows an example of a controller 104 blocking due to an erroneous connection. Based on the path connection configuration described in FIG. 6, a controller number determination method will be described by way of an example where the controller 104A and the controller 104C are connected to ports having the same port number.

The port information from the SWs 112A and 112B indicates that the controller 104A is connected to the ports 0 of the SWs 112A and 112B. Further, the port information from the SWs 112C and 112D indicates that the controller 104C is connected to the ports 0 of the SWs 112C and 112D.

When determining the port number, the port number determination program 401 compares the port information from each SW. When different connection destination controller unique information 202 is assigned to the same port number, for example, when the connection destination controller unique information 202 is a numerical value, a smaller numerical value of the controller unique information 202 is adopted. Here, the connection destination controller unique information 202 to be adopted may be a larger numerical value. Alternatively, in a case of ID information such as a character string, a priority order or a reverse order may be adopted in alphabetical order.

At this time, since the port of the SW 112, to which a controller that is not adopted is connected, is not used, the port number determination program 401 sets the hard invalidation information 203 of the memory 113 of the SW 112 to be invalid and notifies another controller. After the hard invalidation information 203 is updated, the port number determination program 401 again determines the port number. When all the hard invalidation information 203 of the connected port is invalid, the target controller is instructed to be blocked, and the initial startup is performed only by the remaining controllers.

In a case of FIG. 11, it is determined that both the controller 104A and the controller 104C are connected to the port 0 of each SW 112. For example, when the port assigned to the controller 104A is adopted by the port number determination program 401, the hard invalidation information 203 of the port 0 of the SW 112C and the port 0 of the SW 112D are set to be invalid. Thereafter, since it is determined that the controller 104C is not connected to any of the ports, the controller 104C is blocked, and the initial startup is continued with a controller other than the controller 104C.

Figure 12:
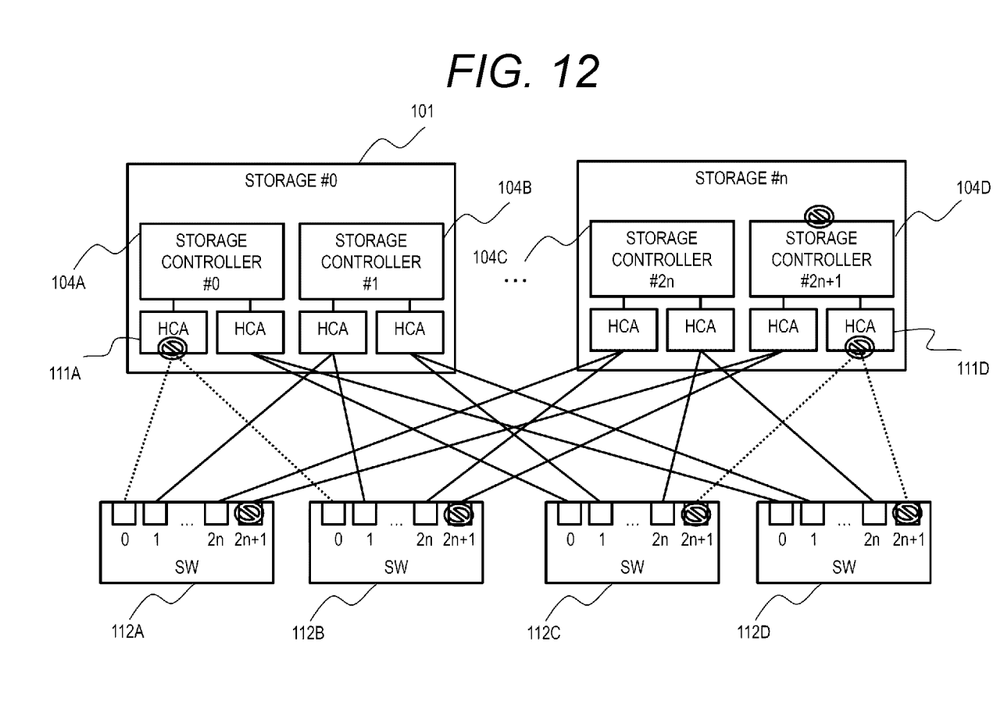
FIG. 12 shows an example of a controller blocking due to an HCA failure.

FIG. 12 shows an example of a controller 104 blocking due to an HCA 111 failure. Based on the path connection configuration described in FIG. 6, a controller number determination method will be described by way of an example where an HCA 111A and an HCA 111D are blocked due to a failure.

Since the HCA 111A is blocked, the controller 104A is not connected to the SW 112A or the SW 112B. Further, since the HCA 111D is blocked, the controller 104D is not connected to the SW 112C or the SW 112D. In this case, the controller 104A and the controller 104D cannot be connected to each other even via any of the SWs 112.

When determining the port number, the port number determination program 401 compares the port information from each SW. When there is a pair of controllers that cannot be interconnected even via any of the SWs 112, for example, when the connection destination controller unique information 202 is a numerical value, a controller having a smaller numerical value of the controller unique information 202 is adopted. Here, a condition of the connection destination controller unique information 202 to be adopted is the same as in FIG. 11.

At this time, since the port of the SW 112, to which a controller that is not adopted is connected, is not used, the port number determination program 401 sets the hard invalidation information 203 of the memory 113 of the SW 112 to be invalid. After the hard invalidation information 203 is updated, the port number determination program 401 again determines the port number. When all the hard invalidation information 203 of the connected port is invalid, the target controller is instructed to be blocked, and the initial startup is performed only by the remaining controllers.

In a case of FIG. 12, the controller 104A and the controller 104D cannot be connected to each other even via any of the SWs 112. For example, when the controller 104A is adopted by the port number determination program 401, the hard invalidation information 203 of a port 2n+1 of each of the SWs 112A, 112B, 112C, and 112D is set to be invalid. Thereafter, since it is determined that the controller 104D is not connected to any of the ports, the controller 104D is blocked, and the initial startup is continued with a controller other than the controller 104D.

As described above, according to the present embodiment, the scale-out storage system can autonomously determine the identification number of each storage controller. In addition, an identification number corresponding to an arrangement position of the storage controller on the network can be assigned. An identification number intended by maintenance personnel can be assigned by performing connection to ports of the same number of the switches for each storage controller by the maintenance personnel. An address of each storage controller can be uniquely determined based on the assigned identification number of each storage controller.

In the above example, each storage controller determines controller numbers of an own device and another device. In another example, each storage controller may only determine the controller number of an own device and may notify another storage controller of the controller number by broadcast.

The invention is not limited to the embodiment described above and may include various modifications. For example, the above embodiment is described in detail for easy understanding of the invention, and the invention is not necessarily limited to an embodiment including all the configurations described above. In addition, a part of the configuration of one embodiment can be replaced with the configuration of another embodiment, and the configuration of another embodiment can be added to the configuration of one embodiment. A part of the configuration of each embodiment may be added, deleted, or replaced with another configuration.

In addition, the configurations, functions, processing units, processing methods, or the like may be achieved by hardware by designing a part or all of them with, for example, an integrated circuit. The configurations, functions, or the like may be achieved by software by interpreting and executing a program, by a processor, for achieving the respective functions. Information such as a program, a table, and a file for achieving the functions can be stored in a recording device such as a memory, a hard disk and a solid state drive (SSD), or a recording medium such as an IC card, an SD card, and a DVD.

Only control lines and information lines that are considered necessary for description are illustrated, and not necessarily all the control lines and information lines required for production are illustrated. In practice, it may be considered that almost all the configurations are connected with each other.

What is claimed is:

1. A storage system comprising:
a plurality of controllers that receive and process an input and output request specifying a volume; and
a plurality of switches each including a plurality of ports,
wherein the plurality of controllers communicate with each other through the plurality of switches connected in parallel,
wherein each of the plurality of switches
acquires a controller identifier of each connected controller through a port of the plurality of ports, and
stores the port identifier of the port associated with the controller identifier in a port information record,
wherein one of the plurality of controllers determines appropriateness of connection between the plurality of controllers and the plurality of switches based on port information records created by the plurality of switches and performs processing based on the appropriateness,
wherein the port information record includes invalidation information indicating validity/invalidity of the port,
wherein the one of the plurality of controllers compares the port information records to set the invalidation information,
wherein the plurality of switches include ports of a same port identifier, and
wherein, when the port information records associate multiple port identifiers with one controller identifier, each port identifier of the multiple port identifiers except one port identifier is set to be invalid.

2. The storage system according to claim 1, wherein, when the port information records indicate different controllers connected to ports of a same port identifier, each controller of the different controllers except one controller is blocked.

3. The storage system according to claim 2, wherein, a controller is blocked when all connected ports of the controller are invalid.

4. The storage system according to claim 3, the one port identifier is selected based on a predetermined rule.

5. The storage system according to claim 1, wherein, when the port information records indicate that two controllers are incapable of communicating with each other, one of the two controllers is blocked.

6. The storage system according to claim 1,
wherein each of the plurality of switches sends port identifiers identifying connected ports to controllers connected to the ports, and
wherein each of the plurality of controllers
acquires a plurality of port identifiers identifying a plurality of connected ports from connected switches, and
determines an internal controller identifier within the storage system based on the acquired plurality of port identifiers.

7. A storage system comprising:
a plurality of controllers that receive and process an input and output request specifying a volume; and
a plurality of switches each including a plurality of ports,
wherein the plurality of controllers communicate with each other through the plurality of switches connected in parallel,
wherein each of the plurality of switches
acquires a controller identifier of each connected controller through a port of the plurality of ports, and
stores the port identifier of the port associated with the controller identifier in a port information record,
wherein one of the plurality of controllers determines appropriateness of connection between the plurality of controllers and the plurality of switches based on port information records created by the plurality of switches and performs processing based on the appropriateness, and
wherein the port information record is stored in a switch that created the port information record and a copy of the port information record is stored in a controller connected with the switch that created the port information record.

8. A method for a storage system,
wherein the storage system includes:
a plurality of controllers that receive and process an input and output request specifying a volume; and
a plurality of switches each including a plurality of ports,
wherein the plurality of controllers communicate with each other through the plurality of switches connected in parallel,
wherein each of the plurality of switches
acquires a controller identifier of each connected controller through a port of the plurality of ports, and
store the port identifier of the port associated with the controller identifier in a port information record, and
wherein one of the plurality of controllers determines appropriateness of connection between the plurality of controllers and the plurality of switches based on port information records created by the plurality of switches and performs processing based on the appropriateness,
wherein the port information record includes invalidation information indicating validity/invalidity of the port,
wherein the one of the plurality of controllers compares the port information records to set the invalidation information,
wherein the plurality of switches include ports of a same port identifier, and
wherein, when the port information records associate multiple port identifiers with one controller identifier, each port identifier of the multiple port identifiers except one port identifier is set to be invalid.

9. The method according to claim 8, wherein, when the port information records indicate different controllers connected to ports of a same port identifier, each controller of the different controllers except one controller is blocked.

10. The method according to claim 9, wherein, a controller is blocked when all connected ports of the controller are invalid.

11. The method according to claim 8, the one port identifier is selected based on a predetermined rule.

12. The method according to claim 8, wherein, when the port information records indicate that two controllers are incapable of communicating with each other, one of the two controllers is blocked.

13. The method according to claim 8,
wherein each of the plurality of switches sends port identifiers identifying connected ports to controllers connected to the ports, and
wherein each of the plurality of controllers
acquires a plurality of port identifiers identifying a plurality of connected ports from connected switches, and
determines an internal controller identifier within the storage system based on the acquired plurality of port identifiers.

14. A method for a storage system, the storage system comprising:
a plurality of controllers that receive and process an input and output request specifying a volume; and
a plurality of switches each including a plurality of ports,
wherein the plurality of controllers communicate with each other through the plurality of switches connected in parallel,
wherein each of the plurality of switches
acquires a controller identifier of each connected controller through a port of the plurality of ports, and
stores the port identifier of the port associated with the controller identifier in a port information record,
wherein one of the plurality of controllers determines appropriateness of connection between the plurality of controllers and the plurality of switches based on port information records created by the plurality of switches and performs processing based on the appropriateness, and
wherein the port information record is stored in a switch that created the port information record and a copy of the port information record is stored in a controller connected with the switch that created the port information record.

* * * * *